(12) United States Patent
Richardson et al.

(10) Patent No.: US 9,001,196 B2
(45) Date of Patent: Apr. 7, 2015

(54) APPARATUS, SYSTEMS AND METHODS FOR SYNCHRONIZATION OF 3-D SHUTTER GLASSES TO ONE OF A PLURALITY OF PRESENTATION DEVICES

(75) Inventors: Jon Richardson, Chamblee, GA (US);
Stephen Strong, Dunwoody, GA (US);
Eric Holley, Atlanta, GA (US);
Frederick Tuck, Dunwoody, GA (US);
Grant Turpin, San Mateo, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 1220 days.

(21) Appl. No.: 12/898,510

(22) Filed: Oct. 5, 2010

(65) Prior Publication Data

US 2012/0081527 A1    Apr. 5, 2012

(51) Int. Cl.
*H04N 13/04* (2006.01)

(52) U.S. Cl.
CPC ....... *H04N 13/0438* (2013.01); *H04N 13/0497* (2013.01)

(58) Field of Classification Search
CPC .................................................. H04N 13/0438
USPC .......................................................... 348/56
See application file for complete search history.

(56) References Cited

U.S. PATENT DOCUMENTS

| 4,967,268 | A | 10/1990 | Lipton et al. | |
|---|---|---|---|---|
| 5,867,210 | A | 2/1999 | Rod | |
| 7,289,539 | B1 | 10/2007 | Mimberg | |
| 2010/0007582 | A1* | 1/2010 | Zalewski | 345/8 |
| 2010/0315316 | A1* | 12/2010 | Mihara et al. | 345/32 |

FOREIGN PATENT DOCUMENTS

WO    2005112476 A1    11/2005

* cited by examiner

*Primary Examiner* — Sath V Perungavoor
*Assistant Examiner* — James Pontius
(74) *Attorney, Agent, or Firm* — Lowe Graham Jones PLLC

(57) ABSTRACT

Three dimensional (3-D) program content viewing system in a media environment with different media presentation devices detects a first synchronization signal transmitted from a first synchronization signal source, wherein the first synchronization signal is associated with first 3-D program content and includes a first signal identifier. The system detects a second synchronization signal transmitted from a second synchronization signal source, wherein the second synchronization signal is associated with second 3-D program content and includes a second signal identifier. The system then receives a selection of one of the first synchronization signal and the second synchronization signal and discriminates between the first synchronization signal and the second synchronization signal based upon the first signal identifier and the second signal identifier. The system then controls a left lens and a right lens of 3-D shutter glasses in accordance with the selected one of the first synchronization signal and the second synchronization signal.

12 Claims, 5 Drawing Sheets

APPARATUS, SYSTEMS AND METHODS FOR SYNCHRONIZATION OF 3-D SHUTTER GLASSES TO ONE OF A PLURALITY OF PRESENTATION DEVICES

BACKGROUND

Three dimensional (3-D) programming, such as videos, movies, television programs and the like, are becoming increasingly available to viewers. Specialized viewing equipment has been developed to facilitate presentation of the 3-D programming. One exemplary 3-D programming presentation technology employs liquid crystal display (LCD) shutter glasses that the viewer views through when looking at the presented 3-D program content.

To achieve the 3-D effect using a 3-D LCD shutter glass presentation system, the 3-D programming is presented as an alternating series of video frames that are alternatively viewed by the viewer's left and right eyes. As the left side and right side images are alternatively presented on a display, the corresponding lens of the LCD shutter glasses alternatively transition between a transparent state and an opaque state in synchronism with the alternatively presented left side and right side images.

The transitioning between the transparent state and the opaque state of the lens of the shutter glasses is controlled by synchronization timing information in a synchronization signal associated with the presented 3-D program content. The synchronization signal may be provided in a variety of manners. For example, the synchronization signal may be provided wirelessly in an infrared or radio frequency signal that is separately transmitted to the shutter glasses. Alternatively, a light-based synchronization signal may be incorporated into the 3-D video stream, such as in the backlighting or other portion of the presented video information.

Such 3-D LCD shutter glasses presentation systems operate satisfactorily when there is one presentation device presenting the 3-D program content on its display, and when there are one or more viewers using their LCD shutter glasses to view the 3-D program content since the same single synchronization signal is used by each of the shutter glasses. However, if there are multiple presentation devices presenting different 3-D program content, then there will be multiple synchronization signals. Accordingly, it may be difficult for a user to get their particular LCD shutter glasses to synchronize to the synchronization signal corresponding to the 3-D program content that they are interested in viewing.

For example, a sports bar or the like may have many televisions (TVs) presenting a variety of different sporting events in the 3-D format. Since the LCD shutter glasses must synchronize to a single synchronization signal, the viewer is limited to viewing only the sporting event that is associated with the synchronization signal. The viewer cannot satisfactorily view other sporting events that are being displayed on the other TVs since those other sporting events are synchronized to a different synchronization signal.

As another example, a show room or other venue may be presenting multiple different video presentations in a 3-D format. To illustrate, an automobile dealership may be presenting different 3-D advertising videos on the different makes and models of automobiles, SUVs, and/or trucks that are available for the automobile dealership. In this example, one or more LCD shutter glasses that are synchronized to a particular 3-D advertising video are not able to view other 3-D advertising videos that are being presented in the showroom.

Accordingly, there is a need in the arts to provide greater flexibility in the deployment of shutter glasses or the like used in a 3-D presentation environment where multiple presentation devices are concurrently presenting different 3-D program content.

SUMMARY

Systems and methods of three dimensional (3-D) program content viewing with shutter glasses in a media environment that present a plurality of different 3-D program content on a plurality of different media presentation devices are disclosed. An exemplary embodiment detects a first synchronization signal transmitted from a first synchronization signal source, wherein the first synchronization signal is associated with first 3-D program content and includes a first signal identifier; detects a second synchronization signal transmitted from a second synchronization signal source, wherein the second synchronization signal is associated with second 3-D program content and includes a second signal identifier; receives a selection of one of the first synchronization signal and the second synchronization signal; discriminates between the first synchronization signal and the second synchronization signal based upon the first signal identifier and the second signal identifier; and controls a left lens and a right lens of 3-D shutter glasses in accordance with the selected one of the first synchronization signal and the second synchronization signal.

BRIEF DESCRIPTION OF THE DRAWINGS

Preferred and alternative embodiments are described in detail below with reference to the following drawings.

DETAILED DESCRIPTION

Figure 1:
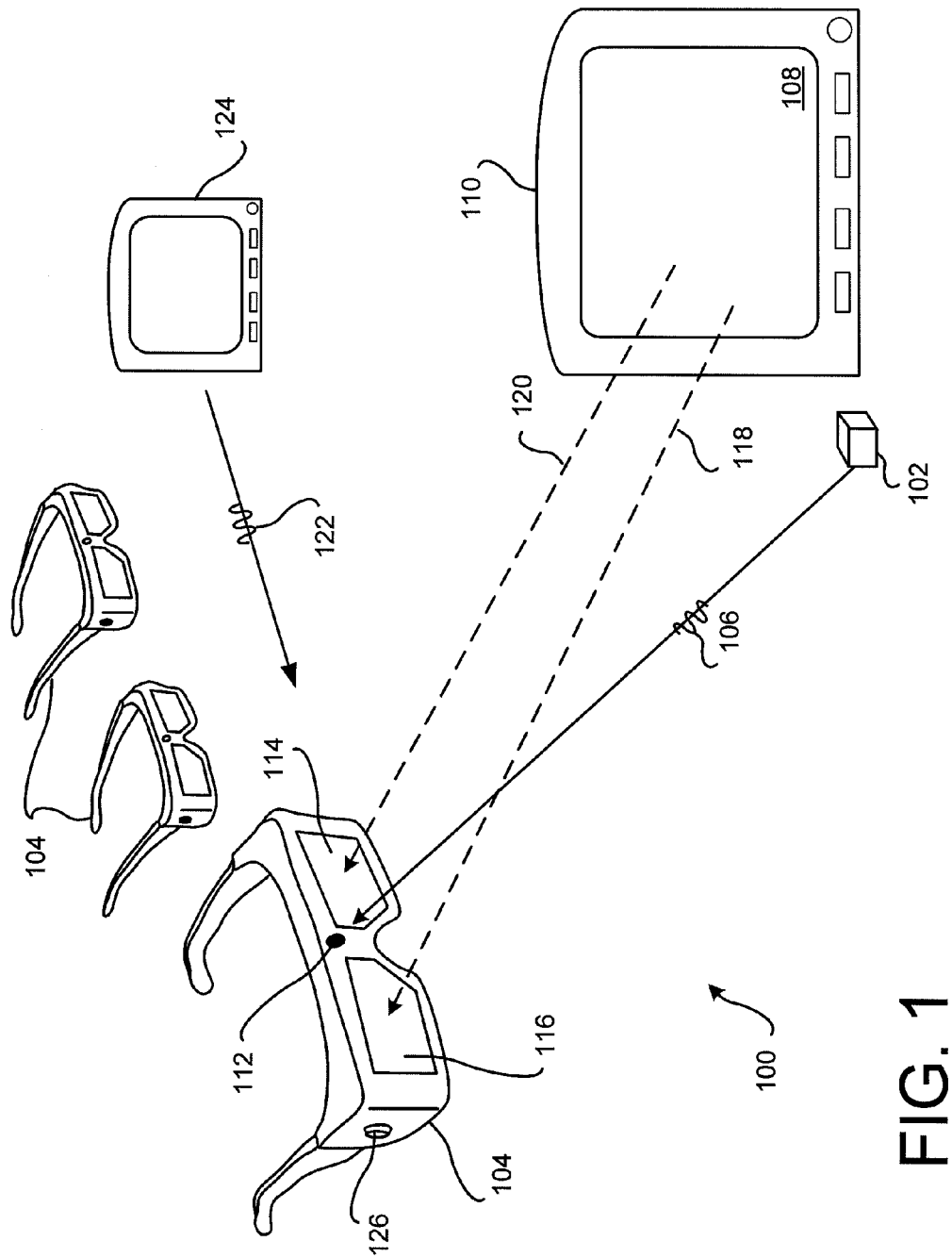
FIG. 1 is a diagram of a three dimensional (3-D) liquid crystal display (LCD) shutter glasses synchronization system comprising a synchronization signal source and a pair of shutter glasses.

FIG. 1 is a diagram of a three dimensional (3-D) shutter glasses synchronization system 100 comprising a synchronization signal source 102 and one or more pairs of shutter glasses 104. An exemplary embodiment is configured to control operation of liquid crystal display (LCD) type shutter glasses 104. Alternative embodiments are configured to operate other types of shutter glasses 104.

The synchronization signal source 102 transmits a synchronization signal 106 associated with 3-D program content presented on a display 108 of a media presentation device 110. A synchronization signal detector 112 on the shutter glasses 104 detects the synchronization signal 106. Synchronization timing information in the synchronization signal 106 causes a left side lens 114 and a right side lens 116 of the shutter glasses 104 to alternatively transition between a transparent state and an opaque state. Accordingly, viewers (not shown) are able to view the presented 3-D program content using their pair of shutter glasses 104. Based upon input from the viewer or another person, embodiments are configured to selectively lock to a particular synchronization signal 106 associated with 3-D program content presented on a particular one of a plurality of media presentation devices 110 that are concurrently operating in a common media environment.

For example, the shutter glasses 104 is conceptually illustrated as being synchronized to the media presentation device 110. During presentation of the 3-D program content on the display 108 of the media presentation device 110, a "left side" image 118 is presented that is intended to be viewed by the viewer's left eye through the left side lens 114. Then, after presentation of the "left side" image 118 ends, a "right side" image 120 is presented that is intended to be viewed by the viewer's right eye through the right side lens 116.

When the "left side" image 118 is presented, the left side lens 114 is transitioned into a transparent state so as to permit viewing of the "left side" image 118 by the viewer's left eye. Concurrently, the right side lens 116 transitions into the opaque state so as to block viewing of the "left side" image 118 by the viewer's right eye. As presentation is changed to the "right side" image 120 (as the next frame in the series of alternating right side and left side image frames), the right side lens 116 is transitioned into a transparent state so as to permit viewing of the "right side" image 120 by the viewer's right eye. Concurrently, the left side lens 114 transitions into the opaque state so as to block viewing of the "right side" image 120 by the viewer's left eye. Accordingly, as the 3-D program content is presented on the display 108 as a series of alternating "left side" images 118 and "right side" images 120, the viewer using the shutter glasses 104 views the 3-D program content as a 3-D video due to the stereoscopic effect caused by the related perspective viewpoints of the presented "left side" images 118 and the "right side" images 120.

Embodiments of the 3-D shutter glasses synchronization system 100 are configured to identify a particular synchronization signal 106 and then "lock" the shutter glasses 104 to that particular synchronization signal 106 associated with different 3-D program content presented on a different media presentation device 124. That is, embodiments are configured to discriminate between the detected "locked" synchronization signal 106 and another concurrently detected synchronization signal 122. Here, discrimination between the detected synchronization signal 106 and other synchronization signals, such as the synchronization signal 122, is based upon a comparison of a unique synchronization signal identifier associated with each of the different synchronization signals. In an exemplary embodiment, the synchronization signal identifier of the other detected synchronization signals do not correspond to the synchronization signal identifier of the synchronization signal 106 that the shutter glasses 104 is currently synchronized to. Accordingly, the other detected synchronization signals may be disregarded or otherwise ignored when detected by the shutter glasses 104.

Accordingly, the other synchronization signal 122 associated with other presented 3-D program content will not disrupt synchronization of the shutter glasses 104. During operation, after the shutter glasses 104 have been locked to the synchronization signal 106, the shutter glasses 104 maintain synchronization to the 3-D program content presented on the media presentation device 110, even when the synchronization signal detector 112 inadvertently detects the other synchronization signal 122.

To illustrate, the viewer may be participating in a conversation with another person. During the course of the conversation, the viewer may briefly orient their shutter glasses 104 away from the synchronization signal source 102 and orient their shutter glasses 104 in a direction that corresponds to the source of the synchronization signal 122. In this example, embodiments of the 3-D shutter glasses synchronization system 100 are operated such that a particular synchronization signal 106 is "locked" to the shutter glasses 104. Accordingly, the other synchronization signal 122 will not disrupt synchronization of the shutter glasses 104 to the 3-D program content presented on the media presentation device 110.

Prior to using their shutter glasses 104, the shutter glasses 104 may not be synchronized to any particular synchronization signal, or may be synchronized to a synchronization signal that is associated with presented 3-D program content that is not of interest to the viewer. To view 3-D program content of interest, the viewer synchronizes the shutter glasses 104 to the synchronization signal 106 provided by the synchronization signal source 102 associated with the 3-D program content of interest (or associated with the media presentation device 110 that is presenting the 3-D program content of interest). Once the shutter glasses 104 are synchronized, the viewer may view the presented 3-D program content of interest on the media presentation device 110.

In an exemplary embodiment, initial synchronization may be effected when the viewer orients the shutter glasses 104 towards the media presentation device 110 that is presenting the 3-D program content of interest. In this embodiment, the shutter glasses 104 are presumably detecting the synchronization signal 106 associated with the presented 3-D program content of interest. Once the viewer has oriented the shutter glasses 104 towards the synchronization signal source 102, the viewer actuates a controller 126 disposed on a surface of the shutter glasses 104. Upon actuation of the controller 126, the shutter glasses 104 synchronizes to, and locks to, the detected synchronization signal 106 associated with the presented 3-D program content of interest being presented on the media presentation device 110.

In an exemplary embodiment, the controller 126 is a button, switch, or the like that is briefly actuated by the viewer. In response to actuation of the controller 126, the shutter glasses 104 synchronize to the currently received synchronization signal 106. If synchronization is successfully effected, then the viewer is able to view the 3-D program content. If synchronization is not successful, then the viewer can re-actuate the controller 126.

Some embodiments may be configured to have the viewer actuate the controller 126 for a predefined duration while the shutter glasses 104 is attempting to synchronize. When the viewer sees presentation of the 3-D program content and appreciates that synchronization has been successful, the controller 126 may then be released.

In an exemplary embodiment, the user will appreciate that synchronization of the shutter glasses 104 is successful when they are able to see correct 3-D presentation of the 3-D program. Alternatively, the synchronization control of the right side lens 116 and the left side lens 114 may be reversed during the synchronization process. Thus, when the left side image is presented, the left side lens 114 is in the opaque state. Similarly, when the right side image is presented, the right side lens 116 will be opaque. Accordingly, when the viewer sees an black or blank screen, then synchronization has been completed. Then, the synchronization control can be reversed so that the 3-D program is viewable.

Embodiments may be configured to permit the viewer to operate the shutter glasses 104 to view different 3-D program content through their shutter glasses 104. For example, the viewer may orient the shutter glasses 104 towards the source of the synchronization signal 122. Upon actuation of the controller 126, the shutter glasses 104 then locks to the synchronization signal 122 so that the shutter glasses 104 become synchronized to the 3-D program content being presented by the media presentation device 124.

The various embodiments of the 3-D shutter glasses synchronization system 100 are configured to differentiate a limited number of unique synchronization signals based upon a unique synchronization signal identifier that is incorporated into, or otherwise embedded within, each of the synchronization signals. By using a limited amount of data for each particular synchronization signal identifier, the synchronization signal identifier may be relatively small enough to be incorporated into, or otherwise embedded within, the synchronization signal 106 along with the synchronization timing information.

An exemplary embodiment communicates the synchronization signal 106 as a digitized information signal, with a portion of the synchronization signal 106 having the synchronization timing information for control of the left side lens 114 and the right side lens 116, and another portion for the synchronization signal identifier. From time to time, such as periodically, one or more times per second, every few seconds, or every few minutes, the synchronization signal identifier is re-transmitted in the synchronization signal 106 so that the shutter glasses 104 may be sure that the correct synchronization signal 106 is being received and/or to be sure synchronization is accurate. Also, the repeated periodic transmission of the synchronization signal identifier allows the viewer to operate their shutter glasses 104 so as to change to and lock onto a different synchronization signal provided by a different synchronization signal source.

When the synchronization signal identifier is using the portion of the synchronization signal 106, the synchronization timing information may not be available in the synchronization signal 106. However, since the "left side" images 118 and "right side" images 120 are alternated at a constant rate during presentation on the media presentation device 110, the synchronization of the shutter glasses 104 may continue during the duration of receipt of the synchronization signal identifier based on the previously received synchronization timing information.

In an exemplary embodiment, the synchronization signal identifier associated with a particular synchronization signal 106 is a binary number. For example, in a media environment with eight multiple media presentation devices 104 that are presenting different 3-D program content, a three digit binary synchronization signal identifier number may permit identification of up to eight different synchronization signal identifiers for eight different synchronization signals 106. In a media environment with up to sixteen different multiple media presentation devices, a four digit binary number permits identification of up to sixteen different synchronization signal identifiers for up to sixteen different synchronization signals 106. In a media environment with up to thirty-two different multiple media presentation devices, a five digit binary number permits identification of up to thirty-two different synchronization signal identifiers for up to thirty-two different synchronization signals 106. Any suitable synchronization signal identifier may be used in the various embodiments of the 3-D shutter glasses synchronization system 100 so that any number of media presentation device 110s in a media environment may be accommodated.

The synchronization signal source 102 may transmit the synchronization signal 106 in any suitable format. For example, the synchronization signal 106 may be transmitted using a suitable wireless signal, such as, but not limited to, an infrared signal or a radio frequency (RF) signal. Some embodiments may transmit the synchronization signal 106 in the backlighting, or in another portion of, the presented 3-D program content. In other embodiments, the synchronization signal source 102 may be transmitted to the shutter glasses 104 over a wire connection.

Figure 2:
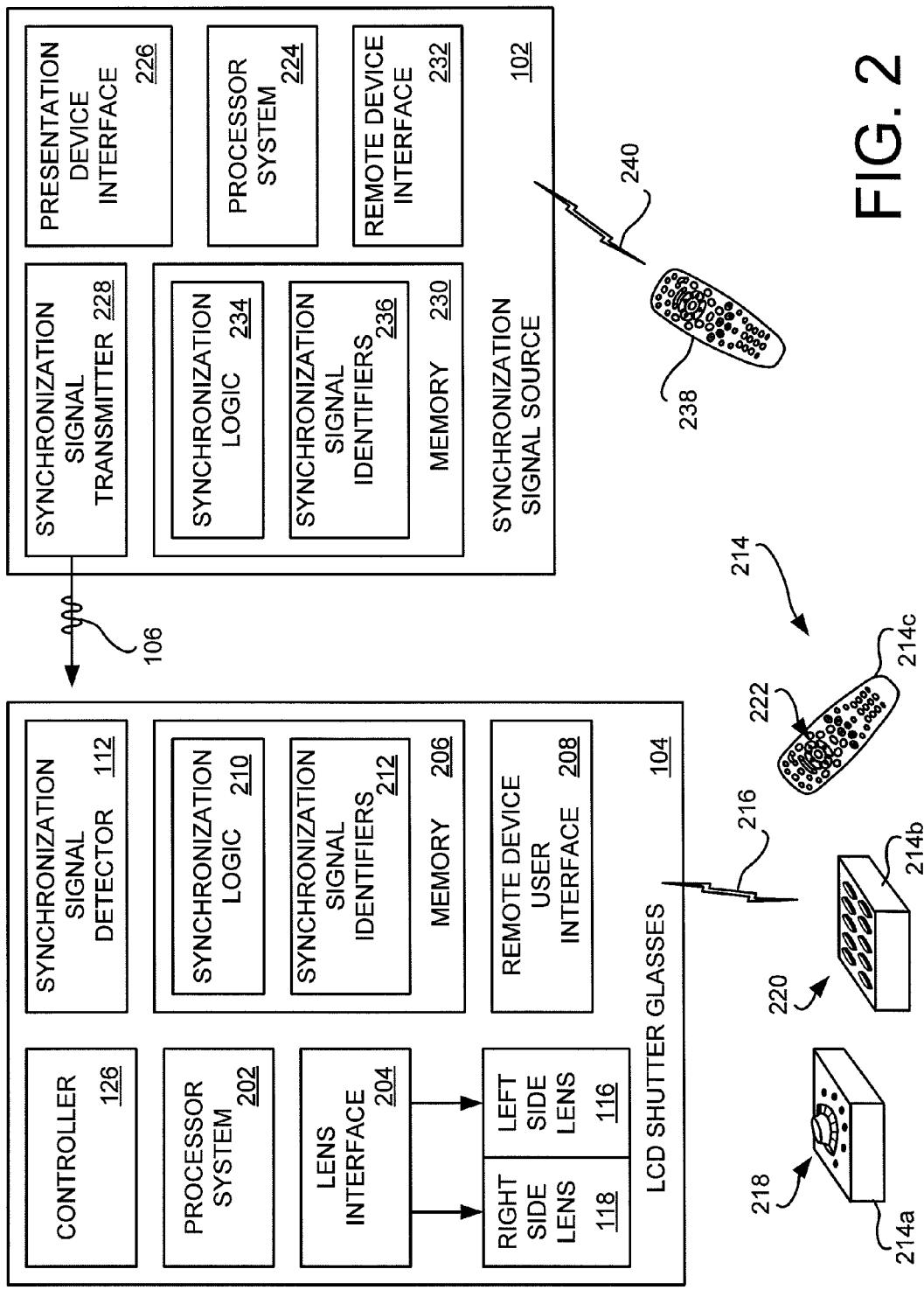
FIG. 2 is a block diagram of an exemplary set of shutter glasses and an exemplary synchronization signal source.

FIG. 2 is a block diagram of an exemplary set of shutter glasses 104 and an exemplary synchronization signal source 102. The exemplary shutter glasses 104 comprises a processor system 202, a lens interface 204, a memory 206, an optional remote user device interface 208, the left side lens 114, the right side lens 116, the synchronization signal detector 112, and the optional controller 126. The memory 206 comprises portions for storing the synchronization logic 210 and one or more synchronization signal identifiers 212. In some embodiments, the synchronization logic 210 may be integrated with other logic (not shown). Other shutter glasses 104 may include some, or may omit some, of the above-described components. Further, additional components not described herein may be included in alternative embodiments.

In an exemplary embodiment, a listing of available synchronization signal identifiers is stored in the synchronization signal identifiers 212 portion of the memory 206. Once one of the available synchronization signal identifiers has been selected, (or a synchronization signal 106 associated with a unique synchronization signal identifier has been selected), the selected synchronization signal identifier may be flagged, saved, or otherwise identified. When different 3-D program content is desired, a different synchronization signal identifier may be selected or otherwise identified.

The synchronization signal detector 112 is configured to receive one or more synchronization signals 106. The processor system 202, executing the synchronization logic 210 and based upon the synchronization timing information of a selected synchronization signal 106, is configured to operate the lens interface 204 to alternatively transition the left side lens 114 and the right side lens 116 between the transparent and opaque states. If multiple synchronization signals 106 are detected by the synchronization signal detector 112, the processor system 202 is configured to differentiate between the selected synchronization signal 106 and the other detected synchronization signals 106 based upon the synchronization signal identifier associated with the selected synchronization signal 106.

Some embodiments of the shutter glasses 104 include the remote user device interface 208 that is configured to receive information corresponding to a selection of 3-D program content of interest from a remote selection device 214. The remote selection device 214 may generate a signal with information corresponding to a selection of 3-D program content of interest, selection of a particular synchronization signal 106, and/or selection of a particular media presentation device 110 that is presenting the 3-D program content of interest. The selection information may be communicated from the remote selection device 214 using a suitable wireless signal 216, such as an IR signal or an RF signal. Alternatively, the selection may be communicated using a wire-based medium communicated over a wire connector (not shown) coupling the remote user device interface 208 and the remote selection device 214.

An exemplary remote selection device 214a comprises a dial 218 or the like that may be rotated by the viewer (or another person) to select 3-D program content of interest, a particular synchronization signal 106, and/or a particular media presentation device 110 that is presenting the 3-D program content of interest. An exemplary remote selection device 214b comprises a plurality of buttons 220 or the like that may be actuated by the viewer to select the 3-D program content of interest, the particular synchronization signal 106, and/or the particular media presentation device 110 that is presenting the 3-D program content of interest.

Indicia on the remote selection devices 214a and/or 214b may be used to identify the 3-D program content of interest, a particular synchronization signal 106, and/or a particular media presentation device 110 that is presenting the 3-D program content of interest. The indicia may be alpha-numeric text, meaningful icons, or the like. For example, the media presentation device 110 may display an identifier, or be located in proximity to the identifier 212 to assist the viewer in operating their shutter glasses 104 to select 3-D program content of interest. The identifier may be a number, a series of letters, and/or a colored panel or area, that corresponds to one of the indicia on the remote selection device 214a or 214b.

The viewer (or other person) may operate the remote selection device 214a by turning the dial 218 to correspond to the indicia on or near the media presentation device 110. With respect to the remote selection device 214b, the viewer (or other person) may actuate one of the buttons 220 that correspond to the indicia on or near the media presentation device 110. Based upon the selection, the remote selection device 214a and/or 214b communicates information corresponding to the selected synchronization signal identifier to the remote user device interface 208. Accordingly, the processor system 202 can then lock the shutter glasses 104 to the specified synchronization signal 106.

In some applications, the remote selection devices 214a and/or 214b may be portable. For example, if the media environment is a sports bar, the waitress, hostess or other employee may bring the remote selection device 214a and/or 214b to the patron's table. In other applications, the remote selection devices 214a and/or 214b may be attached to, built into, or integrated into, a media viewing station or location. For example, the remote selection device 214a and/or 214b may be chained to, glued to, built into, or otherwise attached to, the patron's table.

Alternatively, or additionally, a remote control 214c may be configured to be actuated by the viewer or another person to select the 3-D program content of interest, the particular synchronization signal 106, and/or the particular media presentation device 110 that is presenting the 3-D program content of interest. For example, one or more buttons or other actuators 222 on the surface of the remote control 214c may be used to make the selection, and to cause the remote control 214c to transmit the wireless signal 216 to the remote user device interface 208. The remote control 214c may be a dedicated device that is configured to communicate with the shutter glasses 104, or may be a multi-function device that is additionally configured to communicate with other devices, such as, but not limited to, the media presentation device 110 (FIG. 1).

The exemplary synchronization signal source 102 comprises a processor system 224, a presentation device interface 226, a synchronization signal transmitter 228, a memory 230, and an optional remote device interface 232. The memory 230 comprises portions for storing the synchronization logic 234 and one or more synchronization signal identifiers 236. In some embodiments, the synchronization logic 234 may be integrated with other logic (not shown). Other synchronization signal sources 102 may include some, or may omit some, of the above-described components. Further, additional components not described herein may be included in alternative embodiments. In some embodiments, different memory media may be used to store the synchronization logic 234 and the synchronization signal identifiers 236.

The presentation device interface 226 is configured to receive synchronization timing information from a source signal that is providing and/or presenting the 3-D program content. For example, the 3-D program content source signal may be received by a set top box (STB) or the like that is providing the presented 3-D program content to one or more of the media presentation devices 110. The received 3-D program content source signal includes the synchronization timing information that is used to control operation of the left side lens 114 and the right side lens 116 of the shutter glasses 104. The processor system 224, executing the synchronization logic 234, constructs the synchronization signal 106 based upon the received synchronization timing information and an associated synchronization signal identifier. The synchronization signal transmitter 228 then transmits the synchronization signal 106 to the shutter glasses 104.

In some embodiments, the synchronization signal identifier used by the synchronization signal source 102 to generate the synchronization signal 106 is predefined and is unique to that particular synchronization signal source 102. Alternatively, or additionally, the synchronization signal identifier may be included with the synchronization timing information that is received from the source device that is providing and/or presenting the 3-D program content.

Alternatively, or additionally, the synchronization signal identifier may be specified. In some embodiments, a list of available synchronization signal identifiers resides in the synchronization signal identifiers 236 portion of memory 230. In an exemplary embodiment, a remote control 238 (which may optionally be the same remote as the remote control 214c) may be configured to communicate information corresponding to a particular synchronization signal identifier. The information may be communicated from the remote control 238 to the synchronization signal source 102 using a suitable wireless signal 240 that is receivable by the remote device interface 232. The specified synchronization signal identifier may then be incorporated into the transmitted synchronization signal 106. Alternatively, or additionally, buttons, controllers, and/or actuators (not shown) may be included on the synchronization signal source 102 to enable specification and/or selection of the synchronization signal identifier.

The synchronization signal source 102 may be implemented as a stand-alone device. Alternatively, the synchronization signal source 102 may be integrated into any suitable electronic device, such as, but not limited to, a set top box (STB), a stereo, a surround-sound receiver, a television (TV), a digital video disc (DVD) player, a digital video recorder (DVR), a game playing device, or a personal computer (PC) that is configured to present, or be associated with presentation of, 3-D program content.

Figure 3:
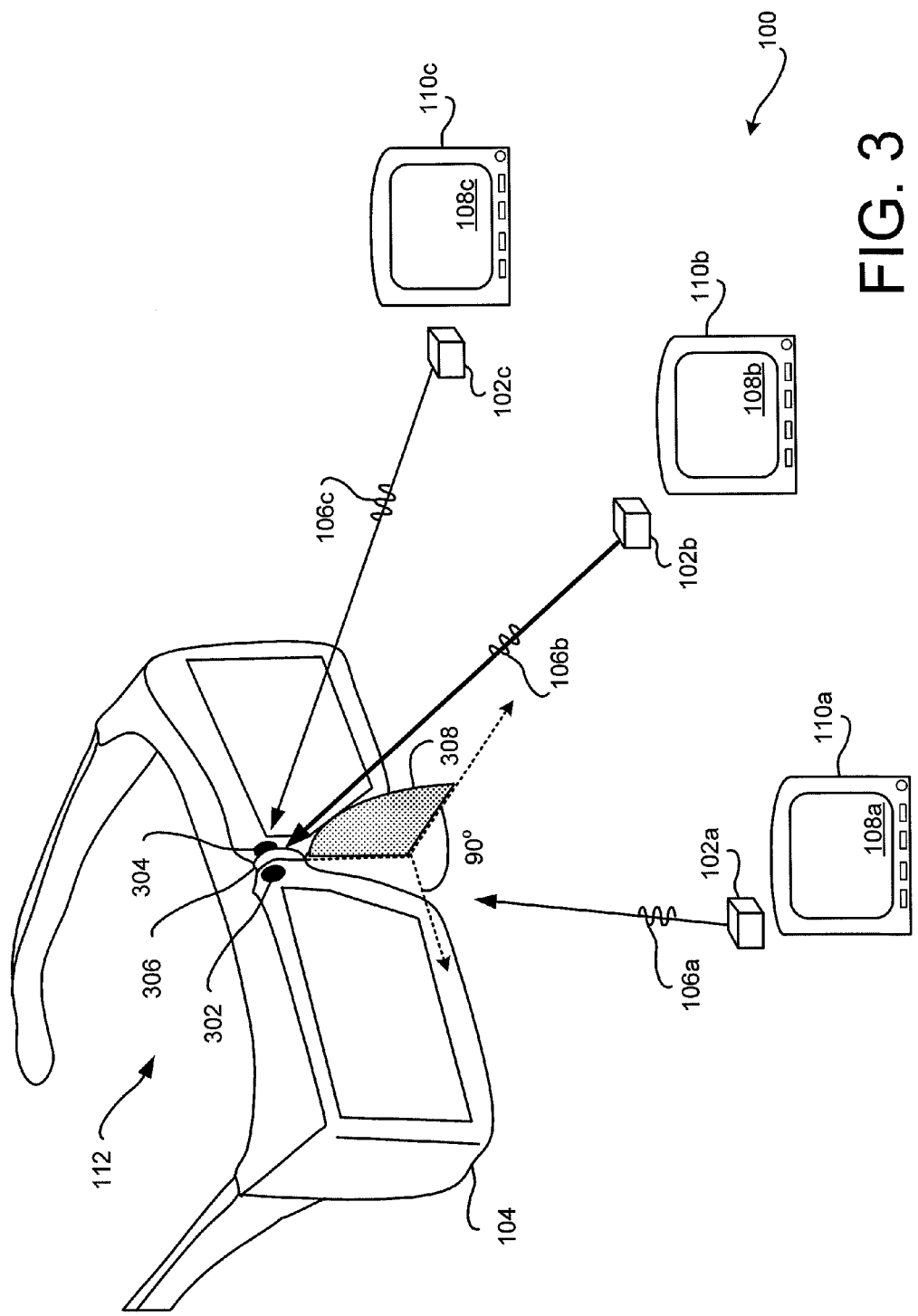
FIG. 3 is a diagram of an exemplary set of shutter glasses with an embodiment of a dual synchronization signal detector.

FIG. 3 is a diagram of an exemplary set of shutter glasses 104 with an embodiment of a dual synchronization signal detector 112. The exemplary dual synchronization signal detector 112 comprises a right side synchronization signal detector 302, a left side synchronization signal detector 304, and a synchronization signal detection divider 306. The synchronization signal detection divider 306 may be any suitable device or structure, such as, but not limited to, a fin, protrusion, plate, or the like that is configured to establish a synchronization signal detection limitation plane 308 that bisects, or limits, a view range of the detectors 302, 304. Accordingly, the right side synchronization signal detector 302 detects only synchronization signals 106 to center and to the right of the synchronization signal detection limitation plane 308 established by the synchronization signal detection divider 306. Similarly, the left side synchronization signal detector 304 detects only synchronization signals 106 to the center and to the left of the detection limitation plane 308 established by the detection divider 306.

Figure 4:
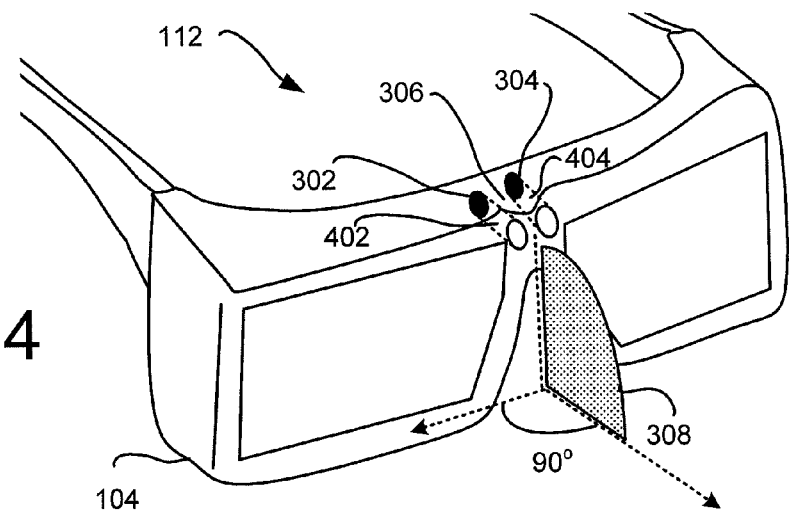
FIG. 4 is a diagram of another exemplary set of shutter glasses with an alternative embodiment of a dual synchronization signal detector.

FIG. 4 is a diagram of another exemplary set of shutter glasses 104 with an alternative embodiment of the dual synchronization signal detector 112. The exemplary dual synchronization signal detector 112 implemented in the shutter glasses 104 of FIG. 4 also comprises a right side synchronization signal detector 302, a left side synchronization signal detector 304, and a detection divider 306. In this embodiment, the synchronization signal detectors 302 and 304 reside in an aperture 402, 404, respectively. Accordingly, the detectors 302 and 304 are set back from, or recessed into, the surface of the shutter glasses 104. The apertures 402, 404 may be implemented as a tunnel, tube, or the like. The structure between the two apertures 402, 404 defines the synchronization signal detection divider 306.

In operation, when the shutter glasses 104 are oriented towards a particular synchronization signal 106, both of the detectors 302, 304 may detect one or more synchronization signals 106. For example, and as conceptually illustrated in FIG. 3, the synchronization signal 106b will be detected by the right side synchronization signal detector 302 and the left side synchronization signal detector 304. Other synchronization signals 106, such as the exemplary synchronization signal 106a, that are oriented to the right of the synchronization signal detection limitation plane 308 will be detectable by the right side synchronization signal detector 302 (and will not be detectable by the left side synchronization signal detector 304). Similarly, other synchronization signals 106, such as the exemplary synchronization signal 106c, that are oriented to the left of the synchronization signal detection limitation plane 308 will be detectable by the left side synchronization signal detector 304 (and will not be detectable by the right side synchronization signal detector 302).

Since each synchronization signal 106 includes its own unique synchronization signal identifier, the 3-D shutter glasses synchronization system 100 is configured to differentiate multiple detected synchronization signals 106 from each other. For example, the synchronization signal 106a may be differentiated from the synchronization signal 106b in an output signal generated by the right side synchronization signal detector 302 based upon their unique synchronization signals identifiers. Similarly, the synchronization signal 106c may be differentiated from the synchronization signal 106b in an output signal generated by the left side synchronization signal detector 302 based upon their unique synchronization identifiers.

Embodiments of the 3-D shutter glasses synchronization system 100 determine which particular 3-D program content is being currently viewed by the user by comparing the outputs of the right side synchronization signal detector 302 and the left side synchronization signal detector 304. When a particular synchronization signal 106 is commonly detected by both the left side synchronization signal detector 304 and the right side synchronization signal detector 302, the 3-D shutter glasses synchronization system 100 determine that the shutter glasses 104 are oriented towards a particular one of the plurality of media presentation devices 110 associated with the commonly detected synchronization signal.

For example, as conceptually illustrated in FIG. 3, the synchronization signal 106b (the common synchronization signal) is being detected by both of the synchronization signal detectors 302 and 304. The processor system 202 (FIG. 2) determines that the shutter glasses 104 are oriented towards the media presentation device 110b, and accordingly, synchronizes to the synchronization signal 106b so that the user views the 3-D program content being presented on the media presentation device 110b.

Figure 5:
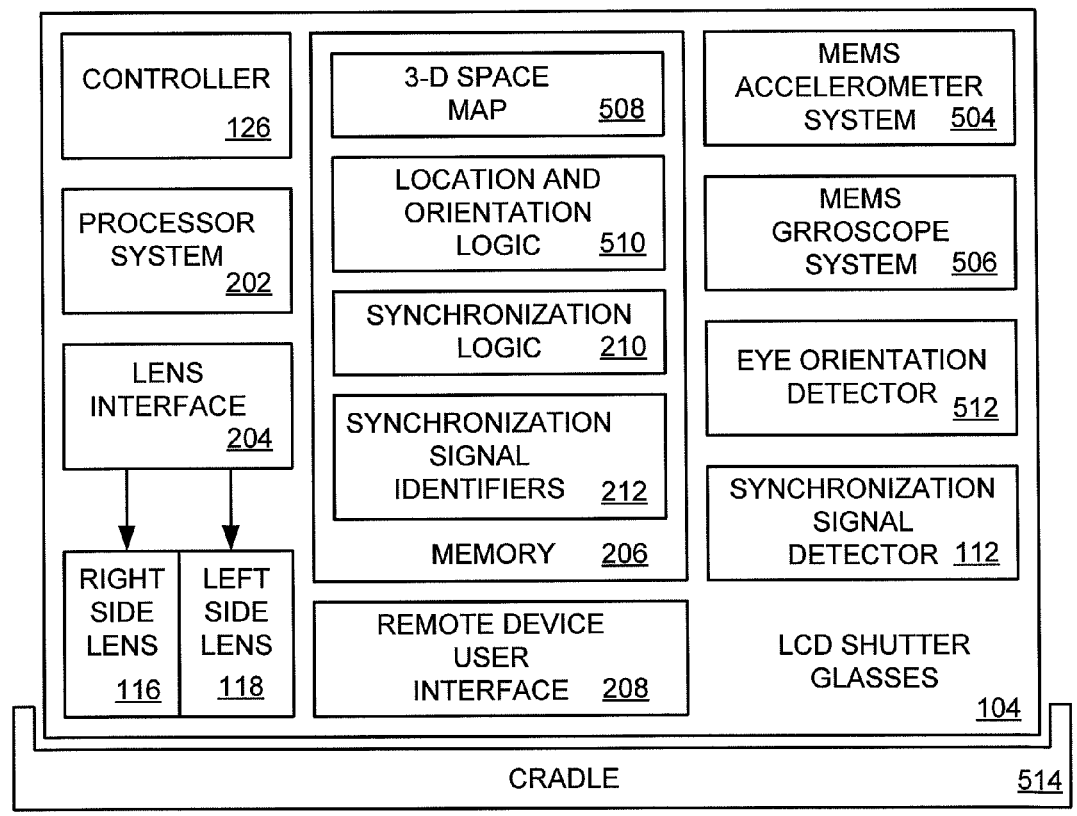
FIG. 5 is a block diagram of an exemplary set of shutter glasses with an exemplary embodiment of a 3-D space location and orientation system.

FIG. 5 is a block diagram of an exemplary set of shutter glasses 104 with an embodiment of a 3-D space location and orientation system 502. The 3-D space location and orientation system 502 comprises a micro-electro-mechanical system (MEMS) accelerometer system 504, a MEMS gyroscope system 506, a 3-D space map 508 (residing in the memory 206 or another suitable memory medium), and the location and orientation logic 510 (residing in the memory 206 or another suitable memory medium). Any suitable MEMS accelerometer system 504 and/or the MEMS gyroscope system 506 may be used by the various embodiments.

The 3-D space location and orientation system 502 is configured to determine a current location and orientation of the shutter glasses 104 in a known 3-D space. Based on a known location and/or orientation of each of a plurality of media presentation devices 110 in the known 3-D space, and based on the determined current location and orientation of the shutter glasses 104 in the known 3-D space, the 3-D space location and orientation system 502 determines which particular media presentation device 110 that the shutter glasses 104 are currently oriented towards. That is, a current viewing orientation of the shutter glasses 104 in the known 3-D space is determinable.

The viewing orientation of the shutter glasses 104 is correlated with the known locations and orientations of the displays 108 of the plurality of media presentation devices 110 to determine if the current location and orientation of the shutter glasses 104 is such that 3-D program content is viewable on a particular one of the plurality of media presentation devices 110. For example, in one situation, the current orientation of the shutter glasses 104 may be towards the media presentation device 110 (FIG. 1), Further, the current location may be generally in front of the display 108 of media presentation device 110. Accordingly, the view orientation of the shutter glasses 104 is such that the user is able to view 3-D media content presented on the display 108. In contrast, if the current location of the shutter glasses 104 is behind the media presentation device 110, then the current viewing orientation of the shutter glasses 104 will not permit viewing of the 3-D program content presented on the display 108 of the media presentation device 110 since the user would be viewing the back side of the media presentation device 110.

When the determined viewing orientation of the shutter glasses 104 is towards a viewable display 108 of a particular one of the media presentation devices 110, the shutter glasses 104 automatically synchronizes to the synchronization signal 106 transmitted by the synchronization signal source 102 associated with that particular media presentation device 110 that it is currently oriented towards. (Alternatively, or additionally, the current location and orientation of the shutter glasses 104 in the known 3-D space may be determined with respect to known locations and/or orientations of the plurality of synchronization signal sources 102.)

In practice, any particular media environment will likely have a limited number of media presentation devices 110 presenting different 3-D media. Thus, the number of media presentation devices 110 will be equal to or less than the number of available synchronization signal identifiers. Since the known 3-D space is determined based upon the location and/or orientation of each media presentation device 110 (and/or location of the synchronization signal sources 102) in the media environment, the synchronization signal identifier associated with each media presentation device 110 is determinable.

After calibration of the shutter glasses 104 to define an initial location and orientation in the known 3-D space, the current location and orientation of the shutter glasses 104 in the known 3-D space is determinable based upon movement of the shutter glasses 104 detected by the MEMS accelerometer system 504 and/or the MEMS gyroscope system 506. Since each synchronization signal 106 has a unique synchronization signal identifier, a correlation may be made between the known location of each of the media presentation devices 110 in the known 3-D space, the synchronization signal identifier in the currently detected synchronization signals 106, and the current location and orientation of the shutter glasses 104. Based on the determined location and orientation of the shutter glasses 104, the synchronization signal identifier associated with a particular one of the media presentation devices 110 that the shutter glasses 104 are currently oriented towards may be determined. The shutter glasses 104 may then synchronize to the synchronization signal 106 having the identified synchronization signal identifier.

Since at any moment the current location and orientation of the shutter glasses 104 in the known 3-D space is known, any subsequent movement of the shutter glasses 104 is detected by the MEMS accelerometer system 504 and/or the MEMS gyroscope system 506. Based upon the detected movement of the shutter glasses 104, an updated current location and orientation of the shutter glasses 104 in the known 3-D space may be determined. That is, the shutter glasses 104 are configured to determine its current location and orientation in the known 3-D space on a real time, or near real time, basis. As the location and/or orientation of the shutter glasses 104 changes, the shutter glasses 104 may automatically resynchronize to the 3-D program of the currently viewed media presentation device 110.

Prior to use, an initial location and an initial orientation of the shutter glasses 104 in the known 3-D space is determined based upon an initial calibration. During operation, the current location and orientation of the shutter glasses 104 in the known 3-D space is continuously re-determined based upon the subsequent detected movement of the shutter glasses 104 with respect to the initial calibration of the shutter glasses 104. Calibration of the shutter glasses 104 may be performed in a variety of ways, depending upon the embodiment.

For example, an exemplary embodiment may be placed in a cradle 514 or the like. The cradle 514 is configured to hold the shutter glasses 104 in an initial position so that the shutter glasses 104, when in the cradle 514, is at a known location and orientation in the known 3-D space. Calibration occurs when the known location and orientation of the shutter glasses 104 in the known 3-D space is saved into the memory 206, or in another suitable memory, while the shutter glasses 104 are in the cradle 514. As the shutter glasses 104 are subsequently moved from the cradle 514, the shutter glasses 104 may then track its movement using the MEMS accelerometer system 504 and/or the MEMS gyroscope system 506, and based upon the detected movement, determines the current location and orientation in the known 3-D space.

Alternatively, or additionally, the shutter glasses 104 may be calibrated by determining the respective orientation of three or more different detected synchronization signals 106. Each detected synchronization signal 106 may be associated with its unique synchronization signal identifier. Based upon the determined orientation of the detected synchronization signals 106 and the known location of the plurality of synchronization signal sources 102 in the known 3-D space, the shutter glasses 104 may then determine its respective location and orientation in the known 3-D space based upon geometric calculations performed by the processor system 202, executing the location and orientation logic 510. That is, based upon the determined orientation of the shutter glasses 104 with respect to three or more of synchronization signal sources 102, and the known location of the synchronization signal sources 102 in the known 3-D space, the current location and orientation of the shutter glasses 104 in the known 3-D space may be determined. For example, if three synchronization signal sources 102 are detectable, a suitable triangulation process may be used to determine the current location and orientation of the shutter glasses 104 in the known 3-D space.

Alternatively, or additionally, the user may initiate calibration of the shutter glasses 104. For example, the user may orient the shutter glasses 104 towards a particular media presentation device 110 and cause the shutter glasses 104 to synchronize to and lock onto the synchronization signal 106 for that particular media presentation device 110. Then, the user may select another one of the plurality of different media presentation devices 110, cause the shutter glasses 104 to lock to the respective synchronization signals 106. As the user calibrates to three or more media presentation devices 110, the location and orientation of the shutter glasses 104 in the known 3-D space may be determined.

Some embodiments may optionally include an eye orientation detector 512. For example, a plurality of media presentation devices 110 may be located in close proximity to, or even adjacent to, each other. The eye orientation detector 512 senses a current orientation of the user's eyes. Selection of a particular synchronization signal 106 for synchronization is then based on the sensed orientation of the user's eyes. That is, the orientation of the user's eyes, rather than the orientation of the shutter glasses 104, is used to determine which particular synchronization signal 106 should be used for synchronization. Any suitable eye orientation apparatus and method may be used in the various embodiments.

Figure 6:
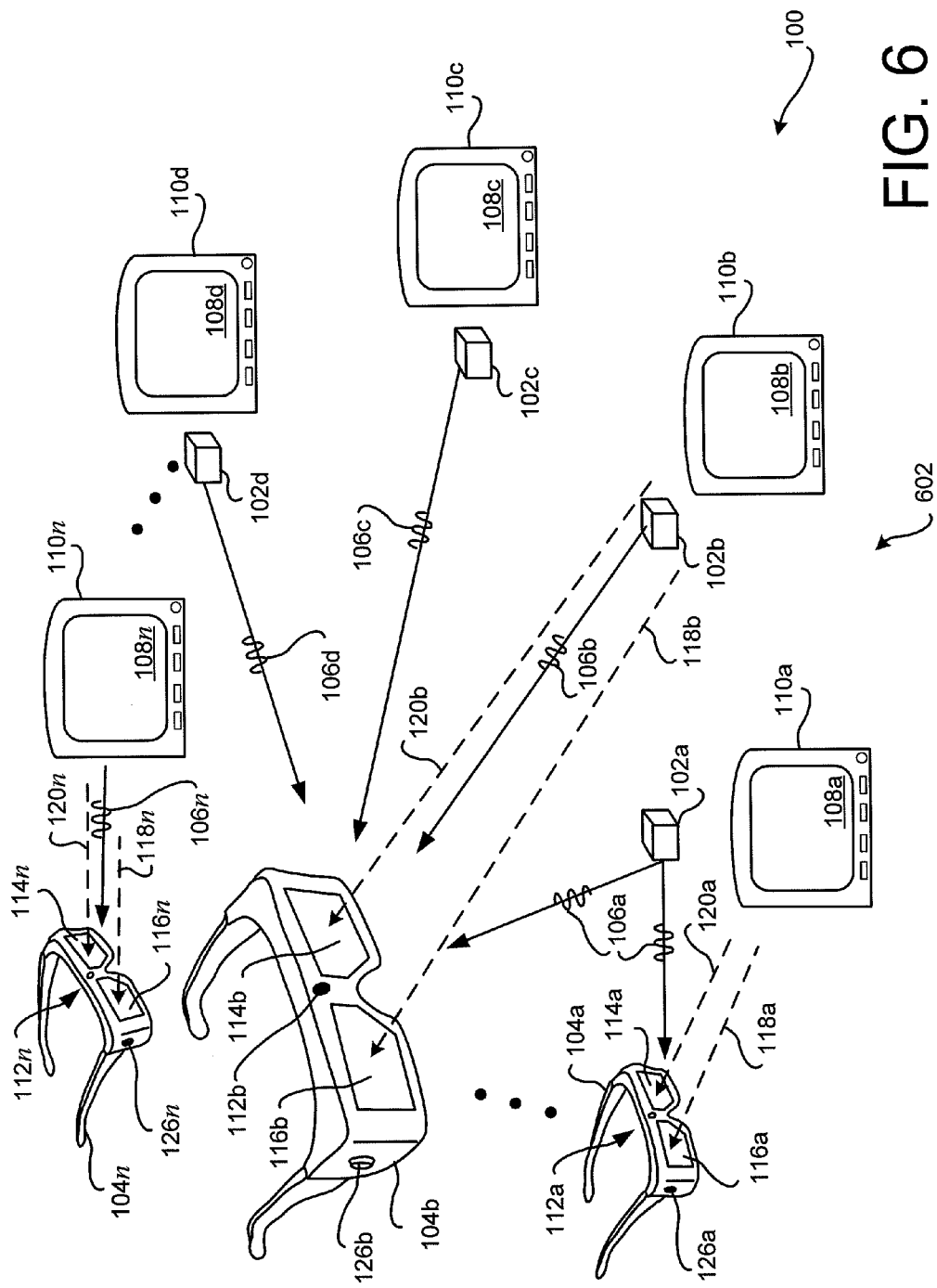
FIG. 6 is a diagram of a media environment where multiple shutter glasses are viewing multiple media presentation devices that are presenting different 3-D program content on their displays.

FIG. 6 is a diagram of a media environment 602 where multiple shutter glasses 104a-104n are viewing multiple media presentation devices 110a-110n that are presenting different 3-D program content on their displays 108a-108n, respectively. The media presentation devices 110a-110n are conceptually illustrated as televisions, though they may be any suitable presentation device configured to present 3-D program content to a viewer.

The exemplary media environment 602 may correspond to a sports bar or other entertainment facility that deploys a plurality of media presentation devices 110a-110n, such as the illustrated televisions, to present sporting events to their patrons. When many different sporting events are presented as 3-D program content, each patron may have their own pair of shutter glasses 104 for viewing the 3-D program content that they are interested in. Each patron is able to set their shutter glasses 104 to synchronize to a particular sporting event of interest. The patrons may bring in their own personally owned shutter glasses 104, or may use one of the shutter glasses 104 owned by the sports bar or other entertainment facility.

Using an exemplary embodiment, when the patron wants to view a different sporting event, then the patron merely resets their shutter glasses 104 to synchronize to the synchronization signal 106 associated with the new sporting event of interest. For example, a patron using the shutter glasses 104b may be viewing the 3-D program content being presented by the media presentation device 110b. Accordingly, the shutter glasses 104b is locked onto the synchronization signal 106b transmitted by the synchronization signal source 102b. At some point, the patron may wish to view the 3-D program content being presented on the media presentation device 110c. The patron resets their shutter glasses 104b to detect and synchronize to the synchronization signal 106c that is transmitted by the synchronization signal source 102c.

In an exemplary embodiment of the shutter glasses 104b implemented with a dual synchronization signal detector embodiment as its detector 112b, the right side of the synchronization signal detector 112b will detect the synchronization signal 106a transmitted by the synchronization signal source 102a and the synchronization signal 106b transmitted by the synchronization signal source 102b. The right side of the synchronization signal detector 112b will not detect the synchronization signals 106c, 106d, and/or 106n transmitted by the synchronization signal sources 102c, 102d and/or 102n, respectively. Concurrently, the left side of the synchronization signal detector 112b will detect the synchronization signals 106b, 106c, and 106d transmitted by the synchronization signal sources 102b, 102c, and 102d, respectively. The left side of the synchronization signal detector 112b will not detect the synchronization signal 106a transmitted by the synchronization signal source 102a. Since the synchronization signal 106b is detected by both the right side and the left side of the synchronization signal detector 112b, the shutter glasses 104b will automatically synchronize to the synchronization signal 106b so that the user views the 3-D program content being presented on the media device 108b.

In an exemplary embodiment of the shutter glasses 104b with the 3-D space location and orientation system 502 (FIG. 5), the shutter glasses 104b will determine its current location and orientation in the media environment 602. Since the location of the media presentation devices 110a, 110b, 110c, 110d through 110n are known, the exemplary shutter glasses 104b will determine that it is located and oriented in a position for viewing the 3-D program content being presented on the media device 108b. Accordingly, since the synchronization signal identifier of the synchronization signal 106b transmitted by the synchronization signal source 102b is known, the shutter glasses 104b will synchronize to the synchronization signal 106b so that the user views the 3-D program content being presented on the media device 108b.

As another example of the media environment 602, the plurality of media presentation devices 110a-110n may be deployed in a product showroom. Each media presentation device 110a-110n may be configured to present 3-D program content pertaining to a different product or a different product feature. One or more of shutter glasses 104 may be locked to a particular one of the media presentation devices 110a-110n for use by potential customers interested in the product that is being advertised in the 3-D program content. Viewing stations may be set up with associated product literature and one or more of the preset shutter glasses 104 (which may be optionally secured to the viewing station). Or, the customer may retune the shutter glasses 104 as they move about the product showroom.

In the exemplary media environment 602, a first viewer (not shown), using their pair of shutter glasses 104a, is able to view 3-D program content that is being presented on the display 108a of the media presentation device 110a. A synchronization signal 106a transmitted by the synchronization signal source 102a is detected by the synchronization signal detector 112a on the shutter glasses 104a. Similarly, a second viewer (not shown) is able to view different presented 3-D program content that is being presented on the display 108b of the media presentation device 110b using their pair of shutter glasses 104b.

Embodiments of the 3-D shutter glasses synchronization system 100 are configured to, when the shutter glasses 104b has been locked to the synchronization signal 106b, discriminate between the detected synchronization signals so as to maintain synchronization to the 3-D program content presented on the media presentation device 110b even when the synchronization signal detector 112b of the shutter glasses 104b inadvertently detects one or more of the other synchronization signals 106a, 106c, and/or 106d. In an exemplary embodiment, during a conversation with another viewer, for example, the second viewer may briefly orient their shutter glasses 104b away from the source of the synchronization signal 106b in a direction that corresponds to the synchronization signal source 102a that is transmitting the synchronization signal 106a. In this example, the shutter glasses 104b is "locked" to the synchronization signal 106b. Accordingly, the other detected synchronization signal 106a will not disrupt synchronization of the shutter glasses 104b.

In an embodiment that has the dual synchronization signal detector 112 (FIG. 3 or 4), and/or the 3-D space location and orientation system 502 (FIG. 5), the shutter glasses 104 are configured to automatically resynchronize to the particular synchronization signal 106 that the shutter glasses 104, and or the viewer's eyes, are currently oriented towards. Some embodiments may include an automatic resynchronization delay duration that prohibits automatic resynchronization for the duration of the delay. Accordingly, if the user briefly looks away from a currently viewed 3-D program content presented from a particular media presentation device 110, the shutter glasses 104 maintain the lock to the current particular synchronization signal 106. Thus, the presentation of the 3-D program content is viewable when the user returns their view to that particular media presentation device 110 within the resynchronization delay duration. However, if the user is looking at a different media presentation device 110, then upon conclusion of the automatic resynchronization delay duration, the shutter glasses 104 automatically synchronize to the synchronization signal 106 that corresponds to the media presentation device 110 that the user is currently looking at. The automatic resynchronization delay duration may be predefined. Alternatively, or additionally, the automatic resynchronization delay duration may be adjustable. For example, but not limited to, the automatic resynchronization delay duration may be adjusted by the user to a duration that the user prefers.

It should be emphasized that the above-described embodiments of the 3-D shutter glasses synchronization system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of viewing three dimensional (3-D) program content in a media environment operable to present different 3-D program content on a plurality of media presentation devices, the method comprising:

receiving, at a pair of 3-D shutter glasses, a selection signal from a controller,
wherein the selection signal corresponds to a user specification selecting first 3-D program content presented by a first one of the plurality of media presentation devices, wherein the selection signal includes at least a unique first signal identifier that uniquely identifies a first synchronization signal transmitted from a first synchronization signal source that controls synchronization of the first 3-D program content being presented by the first one of the plurality of media presentation devices, and wherein the first signal identifier is a first binary number;

storing, at the 3-D shutter glasses, the received first signal identifier:

after storing the first signal identifier at the 3-D shutter glasses, the method further comprising:

detecting, at the 3-D shutter glasses, the first synchronization signal transmitted from the first synchronization signal source, wherein the first synchronization signal is associated with the first 3-D program content and includes the first signal identifier;

detecting, at the 3-D shutter glasses, a second synchronization signal transmitted from a second synchronization signal source, wherein the second synchronization signal is associated with second 3-D program content being presented by a second one of the plurality of media presentation devices, wherein the second synchronization signal includes a second signal identifier that uniquely identifies the second synchronization signal; and wherein the second signal identifier is a second binary number that is different from the first binary number of the first signal identifier;

discriminating between the first synchronization signal and the second synchronization signal based upon the first binary number of the first signal identifier; and controlling a left lens and a right lens of the 3-D shutter glasses in accordance with the selected first synchronization signal.

2. The method of claim 1, further comprising:
detecting a movement of the 3-D shutter glasses;
determining a current location and a current orientation of the 3-D shutter glasses in a known 3-D space based on the detected movement;
determining at least a current viewing orientation of the 3-D shutter glasses in the known 3-D space based on the current location and the current orientation; and
selecting one of the first synchronization signal and the second synchronization signal based on the determined current viewing orientation.

3. The method of claim 2, further comprising:
determining an initial location and an initial orientation of the 3-D shutter glasses in the known 3-D space based upon a calibration,
wherein the current orientation and the current location of the 3-D shutter glasses are based upon the initial location and the initial orientation of the 3-D shutter glasses.

4. The method of claim 1, further comprising:
receiving a specification corresponding to third 3-D program content;
identifying a third synchronization signal identifier from a plurality of synchronization signal identifiers, wherein the third synchronization signal identifier is associated with the third 3-D program content; and
detecting a third synchronization signal associated with the third synchronization signal identifier,
wherein the left lens and the right lens of 3-D shutter glasses are controllable in accordance with the third synchronization signal.

5. The method of claim 4, wherein the left lens and the right lens of 3-D shutter glasses are controllable in accordance with the third synchronization signal after expiration of a resynchronization delay duration.

6. The method of claim 1, wherein the controller is disposed on a surface of the 3-D shutter glasses, and wherein a user of the 3-D shutter glasses actuates the controller while viewing the first 3-D program content being presented by the first one of the plurality of media presentation devices such that the 3-D shutter glasses are oriented so as to detect the first synchronization signal.

7. The method of claim 1, wherein the controller is disposed on a remote controller that is remotely located from the 3-D shutter glasses, and wherein a user of the 3-D shutter glasses actuates the remote controller to select the first 3-D program content being presented by the first one of the plurality of media presentation devices, and wherein the remote controller communicates the selection signal to the 3-D shutter glasses.

8. A method of viewing three dimensional (3-D) program content in a media environment operable to present different 3-D program content on a plurality of media presentation devices, the method comprising:

detecting, with a first detector disposed on a surface of 3-D shutter glasses, a first synchronization signal transmitted from a first synchronization signal source, wherein the first synchronization signal is associated with first 3-D program content presented by a first one of the plurality of media presentation devices:

detecting, at the first detector disposed on the surface of the 3-D shutter glasses, a second synchronization signal transmitted from a second synchronization signal source, wherein the second synchronization signal is associated with second 3-D program content presented by a second one of the plurality of media devices;

detecting the first synchronization signal with a second detector disposed on the surface of the 3-D shutter glasses, wherein the second synchronization signal is not being detected with the second detector when the first synchronization signal is being detected; and controlling a left lens and a right lens of the 3-D shutter glasses in accordance with the first synchronization signal based upon the detection of the first synchronization signal by the first detector and the second detector.

9. A pair of three dimensional (3-D) shutter glasses, comprising:
a left lens;
a right lens;
a synchronization signal detector configured to detect at least one of a first synchronization signal and a second synchronization signal,
wherein the first synchronization signal includes a first synchronization signal identifier and first synchronization timing information that is configured to control the left lens and the right lens of the 3-D shutter glasses to enable viewing of first presented 3-D program content,
wherein the first synchronization signal identifier is a first binary number, and
wherein the second synchronization signal includes a second synchronization signal identifier and second synchronization timing information that is configured to control the left lens and the right lens of the 3-D shutter glasses to enable viewing of second presented 3-D program content, and wherein the second synchronization signal identifier is a second binary number that is different from the first binary number of the first synchronization signal identifier; and a processor system communicatively coupled to the left lens, the right lens and the synchronization signal detector, wherein the processor system is configured to operate the left lens and the right lens in accordance with one of the first synchronization timing information and the second synchronization timing information, wherein a selection of the first synchronization timing information and the second synchronization timing information is based upon one of the first synchronization signal identifier and the second synchronization signal identifier.

10. The 3-D shutter glasses of claim 9, further comprising:

a controller communicatively coupled to the processor system, and configured to generate a selection command corresponding to a selection of one of the first synchronization signal identifier and the second synchronization signal identifier, wherein the selection command selecting one of the first synchronization timing information and the second synchronization timing information is communicated from the controller to the processor system, wherein after the communicated selection command specifies one of the first binary number and the second binary number, and wherein the processor system uses the first synchronization timing information when the first binary number is specified in the selection command, and wherein the processor system uses the second synchronization timing information when the second binary number is specified in the selection command.

11. The 3-D shutter glasses of claim 9, wherein the synchronization signal detector comprises:

a synchronization signal detection divider configured to establish a synchronization signal detection limitation plane;

a left side synchronization signal detector disposed to the left of the synchronization signal detection divider, communicatively coupled to the processor system of the 3-D shutter glasses, and configured to detect synchronization signals that are oriented to at least a center of and to a left side of the synchronization signal detection limitation plane; and a right side synchronization signal detector disposed to the right of the synchronization signal detection divider, communicatively coupled to the processor system of the 3-D shutter glasses, and configured to detect synchronization signals that are oriented to at least the center of and to a right side of the synchronization signal detection limitation plane, where in response to concurrent detection of a common synchronization signal by both the left side synchronization signal detector and the right side synchronization signal detector, the 3-D shutter glasses enable viewing of 3-D program content associated with the detected common synchronization signal.

12. The 3-D shutter glasses of claim 9, further comprising:

a memory communicatively coupled to the processor system, and configured to store at least information corresponding to at least a first known location of a first media presentation device operable to present the first 3-D program content, and configured to store at least information corresponding to a second known location of a second media presentation device operable to present the second 3-D program content; and at least one of a micro-electro-mechanical system (MEMS) accelerometer system and a MEMS gyroscope system communicatively coupled to the processor system, wherein the MEMS accelerometer and MEMS gyroscope systems are configured to detect motion of the 3-D shutter glasses, wherein the processor system is further configured to determine a current location and a current orientation of the 3-D shutter glasses based upon the detected motion of the 3-D shutter glasses, where in response to the determination that the current location and the current orientation of the 3-D shutter glasses corresponds to a viewing orientation towards a first display of the first media presentation device, the 3-D shutter glasses enable viewing of the first 3-D program content presentable on the first media presentation device, and where in response to the determination that the current location and the current orientation of the 3-D shutter glasses corresponds to the viewing orientation towards a second display of the second media presentation device, the 3-D shutter glasses enable viewing of the second 3-D program content presentable on the second media presentation device.

* * * * *